B. J. SWENEY.
SPRINKLER.
APPLICATION FILED NOV. 13, 1908.
917,377.
Patented Apr. 6, 1909.
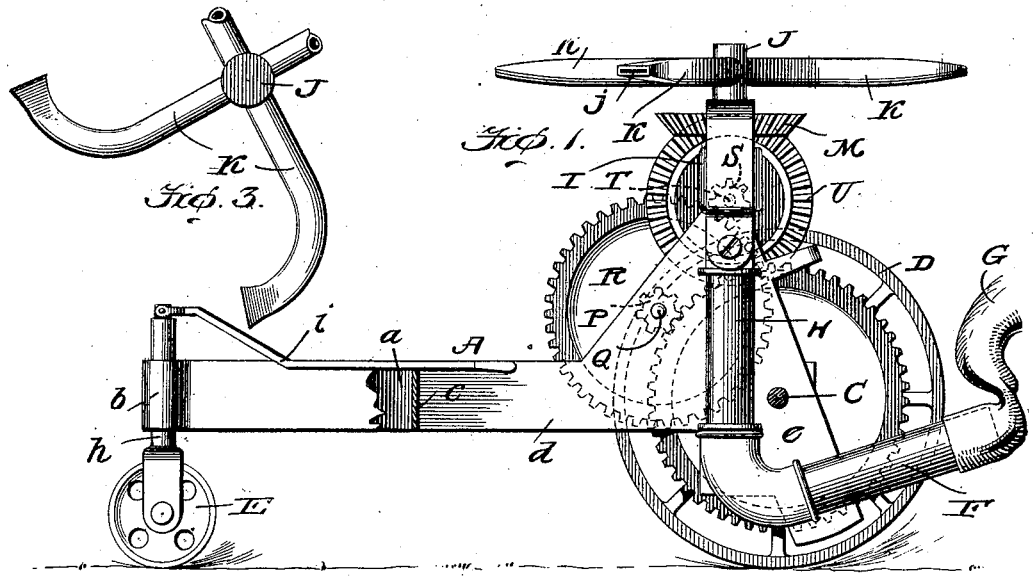
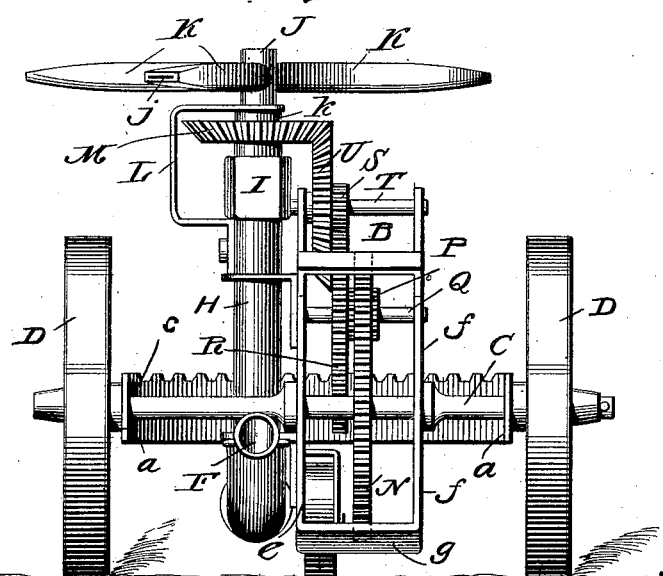
Witnesses
Inventor
B. J. Sweney
By James J. Shirley
Attorney

UNITED STATES PATENT OFFICE.

BENJAMIN J. SWENEY, OF WICHITA, KANSAS.

SPRINKLER.

No. 917,377.     Specification of Letters Patent.     Patented April 6, 1909.

Application filed November 13, 1908. Serial No. 462,415.

*To all whom it may concern:*

Be it known that I, BENJAMIN J. SWENEY, citizen of the United States, residing at Wichita, in the county of Sedgwick and State of Kansas, have invented new and useful Improvements in Sprinklers, of which the following is a specification.

My invention pertains to means for sprinkling lawns, gardens and the like; and it has for its general object to provide a sprinkler embodying such a construction that a head of water from a main or other source of supply is utilized to actuate a water-distributing device, and, through said device, propel the sprinkler over the area to be watered.

Other advantageous features of the invention will be fully understood from the following description and claim when the same are read in connection with the drawings, accompanying and forming part of this specification, in which:

Figure 1 is a view, partly in side elevation and partly in section, of a traveling sprinkler constituting a practical embodiment of my invention. Fig. 2 is a rear elevation of the sprinkler. Fig. 3 is a detail broken plan view showing the arrangement of the plurality of discharge conduits of the water-distributing device, relative to the vertically disposed rotary head by which said conduits are supplied with water.

Similar letters designate corresponding parts in all of the views of the drawings, referring to which:

A is the main frame of my novel sprinkler, which preferably comprises side bars $a$ brought together at the forward end of the frame to form a vertically disposed bearing $b$ for the stem of the guide wheel, presently described, a transverse rack bar $c$, a longitudinal-central bar $d$ having a rear depending portion $e$, and a bar $f$ connected by a cross-bar $g$ with the depending portion $e$ of the bar $d$ and designed to serve in combination with the said bar $d$ and the depending portion $e$ thereof to form a sub-frame B for certain gearing hereinafter described in detail.

Journaled in the side bars $a$ and the bars $d$ and $f$ is a shaft C equipped at its ends with wheels D. When desired both of the wheels D may be fixed on the shaft C or else one of the wheels may be fixed on the shaft and the other loosely mounted thereon, the latter provision being desirable for obvious reasons when it is necessary to move the sprinkler in a circle.

The forward portion of the main frame A is supported by a guide wheel E having a stem $h$ journaled in the bearing $b$ of the frame and equipped above the said bearing with a suitable lever $i$. The said lever is designed to be removably arranged in one of the interdental spaces of the rack on the bar $c$, after the manner shown in Fig. 1, with a view of enabling the wheel E to guide the machine in the course desired.

F is a pipe extending rearwardly with reference to the main frame A and designed to be connected, as shown in Fig. 1, with a hose G leading from a suitable source of water supply, and H is an upright pipe fixed to the longitudinal central bar $d$ of the main frame and connected at its lower end with the pipe F. At its upper end the said pipe H is preferably, though not necessarily, provided with a stuffing box I, and in the said box is journaled the vertically disposed rotary head J for supplying with water the discharge conduits K which it carries. The said conduits K are preferably curved in the manner shown in Fig. 3, though they might be curved in any other manner consonant with the purpose of my invention, and their outer ends are flattened, by preference, so as to form eduction orifices $j$ adapted to throw the water in the form of a horizontal spray.

The rotary head J is provided at $k$ with a shoulder which is arranged below the upper horizontal arm of a strap L, fixed to the side of the upright pipe H and having for its office to hold the head J down in the stuffing box I without interfering in measurable degree with the free rotation of the head. I would have it understood, however, that this is but one embodiment of my invention, and that the rotary head J of the water-distributing device may be mounted to rotate with respect to the upright pipe H in any approved manner without involving departure from the scope of my invention as defined in the claim appended.

At a point immediately below the shoulder $k$, the rotary head J is equipped with a miter gear M, and intermediate the said miter gear and the shaft C is a connection for driving the latter by the former, the said connection in the present instance being made up of a shaft T, a miter gear U fixed thereon and intermeshed with the miter gear M, a spur pinion S also fixed on the shaft T, a shaft Q, a spur gear R fixed on said shaft Q and intermeshed with the pinion S, a spur pinion P also fixed on the shaft Q, and a spur gear N fixed on the shaft C and intermeshed with the pinion P.

By virtue of the interposition of a driving connection such as described between the rotary head J of the rotary water-distributing device and the shaft C, it will be manifest that the rotary water-distributing device will make a large number of revolutions to each revolution of the wheels D, and in consequence a copious quantity of water will be thrown in the form of a fine spray for a considerable distance about the sprinkler incidental to the comparatively slow forward movement of the same under the action of the head of water from a main, force pump or other suitable source of water supply.

In the practical use of the sprinkler the guide wheel E is fixed in a position parallel to the wheels D when it is desired to propel the machine in a straight line, but when it is desired for the machine to take a circular course on the lawn or other area to be sprinkled, the guide wheel E is adjustably fixed at an angle to the vertical plane of the wheels D, whereupon, as will be readily understood, the supply of a head of water to the machine will result in the machine describing an approximate circle, and incidental to said propulsion of the machine water will be distributed in a fine spray over a considerable area about the machine.

As will be readily understood from the foregoing the extent of movement of the machine is limited by the length of the hose G, and when the machine reaches the end of its traverse it may be picked up by an attendant and carried back to a point adjacent to where the hose is connected with the source of supply and may then be started on a new course. It will also be understood that when the hose G is connected in a swiveled manner with a source of supply about which the machine is to be propelled by the head of water supplied thereto, the machine will operate until the supply of water thereto is cut off, and this without labor on the part of those having the machine in charge.

The construction herein illustrated and described constitutes the best practical embodiment of my invention of which I am cognizant, but it is obvious that in the future practice of the invention such changes or modifications may be made as fairly fall within the scope of my invention as defined in the claim appended.

Having described my invention, what I claim and desire to secure by Letters-Patent, is:

The combination in a self-propelling sprinkler, of a wheel-supported main frame, a sub-frame of U-shape fixed with respect to the main frame, a rack-bar also fixed with respect to the main frame, a guide wheel, a stem journaled in the main frame and connected with the guide wheel, means on the stem adapted to be removably engaged with the rack-bar, a shaft journaled in the main frame and sub-frame and adapted to transmit motion to one or more of the wheels, an upright pipe fixed with respect to the main frame and adapted at its lower end to be connected with a hose and having a stuffing box at its upper end, a rotary, water-distributing device comprising a vertical head journaled in said stuffing box, and one or a plurality of horizontally disposed discharge conduits extending from the head, a gear on the shaft, a gear on the vertical head of the water-distributing device, and a train of gears arranged in the sub-frame and adapted to transmit motion from said rotary head to said shaft.

In testimony whereof I have hereunto set my hand in presence of two subscribing witnesses.

BENJAMIN J. SWENEY.

Witnesses:
 J. N. RICHARDSON,
 W. H. BRETCH.